| United States Patent [19] | [11] Patent Number: 4,689,210 |
| Henderson | [45] Date of Patent: Aug. 25, 1987 |

[54] SEPARATION OF ASH AND CHAR IN THE FORMATION OF CARBON BLACK FROM COAL

[75] Inventor: E. Webb Henderson, Bartlesville, Okla.

[73] Assignee: Phillips Petroleum Company, Bartlesville, Okla.

[21] Appl. No.: 829,960

[22] Filed: Feb. 18, 1986

[51] Int. Cl.$^4$ .................. C01B 31/02; C09C 1/48
[52] U.S. Cl. ..................... 423/449; 423/461
[58] Field of Search ............... 423/449, 460, 461, 445, 423/450; 201/29, 34

[56] References Cited

U.S. PATENT DOCUMENTS

| 3,424,556 | 1/1969 | Johnson | 423/449 |
| 3,773,904 | 11/1973 | Iyengar et al. | 423/449 |
| 4,185,083 | 2/1980 | Walker | 423/449 |
| 4,301,747 | 11/1981 | Lockwood, Jr. et al. | 110/171 |

OTHER PUBLICATIONS

Authors: R. Haque, R. K. Chakrabarti, M. L. Dutta, and M. S. Iyengar, "Production of Carbon Black from Assam Coal", Nov. 4, 1971, pp. 421–424, Printed in the Ind. Eng. Chem. Prod. Res. Develop., vol. 10, No. 4, 1971.
Authors: The Babcock and Wilcox Company, New York, pp. 28-2 and 28-3, Steam, Its Generation and Use.
Kirk–Othmer, Encyclopedia of Chemical Technology, 2nd ed., vol. 10, 1966.
Considine, Chemical and Process Technology Encyclopedia, 1974, pp. 688 and 689.

Primary Examiner—Gregory A. Heller
Attorney, Agent, or Firm—Laney, Dougherty, Hessin & Beavers

[57] ABSTRACT

A process of separating ash and char and the partial combustion formation fo carbon black from coal wherein coal, fuel and air are introduced at the top of a down draft slagging combustor operating above the melting point of ash so that molten ash aggregates in the combustor and precipitates to the bottom of the combustor. After the molten ash as been precipitated, the remaining carbon black, flue gas and char are conveyed to a char removal chamber where char falls from the flue gas and carbon black. This carbon black and flue gas are then conventionally separated. Oxygen is added to maintain the temperature of the combustor for a sufficient time for the molten ash to aggregate and precipitate. Additionally, a flux such as calcium carbonate can be added to reduce the melting point of the ash.

16 Claims, 2 Drawing Figures

SEPARATION OF ASH AND CHAR IN THE FORMATION OF CARBON BLACK FROM COAL

BACKGROUND OF THE INVENTION

1. Field of the Invention

The present invention relates in general to partial combustion processes for forming carbon black, and in particular, to a partial combustion method of forming carbon black from coal in which the ask and char formed in the process are separated from the carbon black.

2. Description of the Prior Art

Methods for producing carbon black from coal are well-known. An example of a fuel-rich or partial combustion carbon black formation process is shown in U.S. Pat. No. 3,773,904. Generally, coal is crushed and introduced with air into a reactor operating at approximately 1200° C. The coal thermally decomposes in the reactor forming flue gases, carbon black, ash and char. The carbon black, ash and char are dry and fine and, therefore, are carried by the rapidly flowing flue gases. This rapidly flowing gas carrying the carbon black, ash and char flows from the reactor to a cyclone for separating the ash and char from the carbon black and flue gas. The flue gases and carbon black are then separated by a water scrubber and electrostatic precipitator. It is also possible to separate the carbon black from the flue gases by means of screens or filters.

A particular problem of the prior art is that char and ash as a produce of carbon black formation is not very useful. Although the char could be used as fuel, it does not have a very high heating value if it contains a significatn amount of ash. Separation of the ash from the char fuel might be accomplished by known separation methods, but such separation methods would be either expensive or inefficient. Accordingly, the char and ash from partial combustion carbon black processes have heretofor not been a particularly desirable product.

It is accordingly an object of the present invention to provide a method of separating char and ash in a partial combustion process of forming carbon black from coal. It is also an object of the present invention to provide such a separation process which is energy efficient and which does not require expensive equipment.

SUMMARY OF THE INVENTION

In accordance with these objects, the present invention provides a process of separating ash and char in a partial combustion formation of carbon black from coal. The process comprises the steps of introducing coal, fuel and air into a down draft slagging combustor operating above the melting point of ash to form a rapidly moving partially combusted stream of molten ash, char, carbon black and flue gas in the combustor. The molten ash aggregates as it moves down the combustor. The aggregated molten ash separates from the partially combusted stream and is deposited at the bottom of the slagging combustor. It is removed from the bottom of the combustor in a separated molten ash stream.

After the molten ash precipitates to the bottom of the combustor, the remaining rapidly moving stream of char, carbon black and flue gas is introduced from the slagging combustor into a char removal chamber. In this chamber the char, carbon black and flue gas are directed upwardly and the flow rate is sufficiently low that the heavier char drops to the bottom of the char removal chamber while the carbon black and flue gas pass overhead. The char is removed from the char removal chamber as a char stream. After removal of the ash and char, the carbon black and flue gas are conventionally separated resulting in a carbon black product.

The present invention achieves an operating temperature in the slagging combustor which is above the melting point of ash preferably by introducing oxygen to the combustor or with the coal, fuel and air. The oxygen causes the fuel-rich mixture to burn hotter resulting in a higher operating temperature. By introducing oxygen, the temperature of the partially combusted stream can be maintained in the range of from about 1425° C. to about 1650° C., the preferable range for forming a molten ash which will aggregate and precipitate in the slagging combustor. It must be maintained in this temperature range until the molten ash separates form the char, carbon black and flue gas. In addition to or instead of adding oxygen, a flux such as calcium can be added to the coal, fuel and air to reduce the melting point of the ash allowing the aggregation and separation.

To promote aggregation of the molten ash in the combustor, the fuel, coal and air can be tangentially introduced to the top of the combustor so that a helically falling stream is created in the combustor. The helical motion causes the molten ash particles to collide promoting aggregation and separation of the ash from the char, carbon black and flue gas.

For a further understanding of the invention, and further objects, features and advantages thereof, reference may now be had to the following description taken in conjunction with the accompanying drawings.

DESCRIPTION OF PREFERRED EMBODIMENTS

Figure 1:
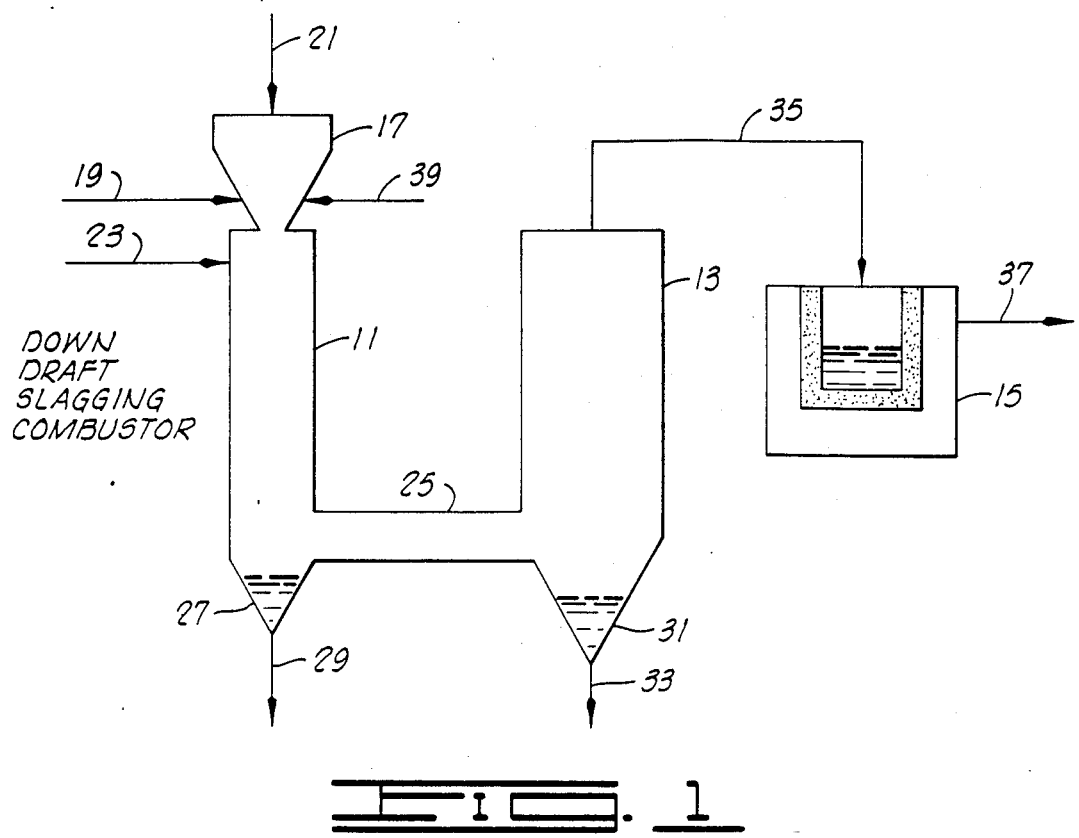
FIG. 1 is a schematic view of a process in accordance with the present invention.
Figure 2:
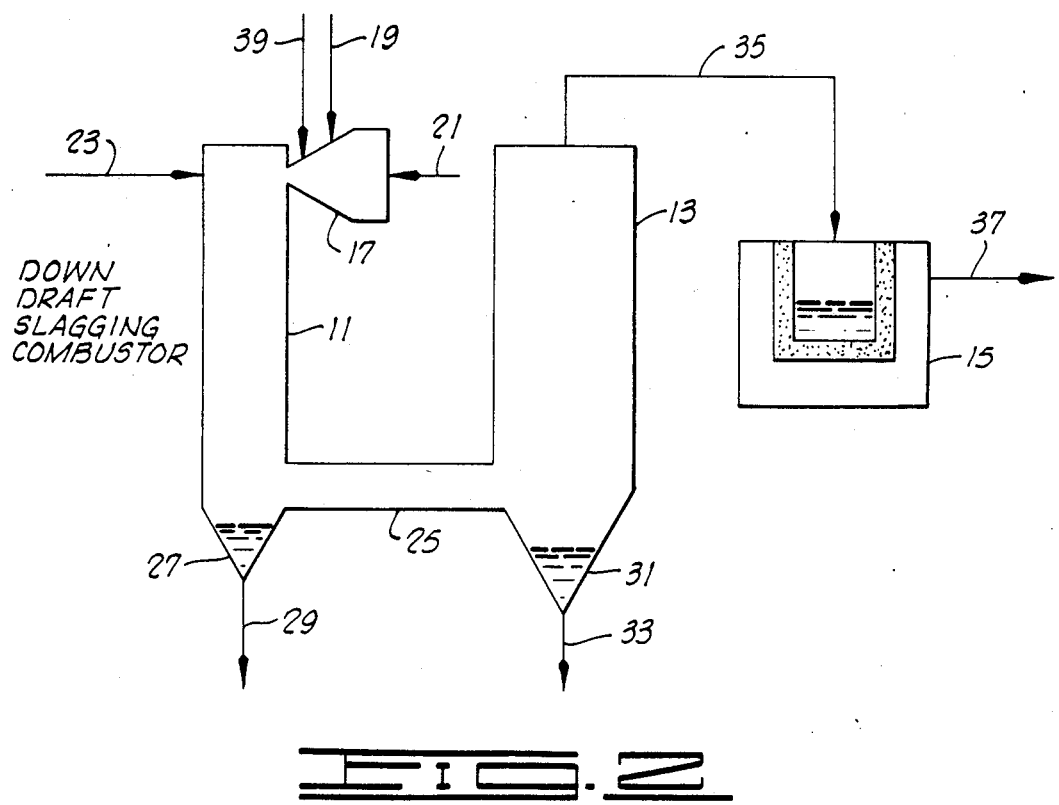
FIG. 2 is a schematic view of an alternate embodiment of a process in accordance with the present invention.

Referring now to FIG. 1 and FIG. 2, a process in accordance with the present invention is illustrated schematically showing a vertically oriented, cylindrical, down draft slagging combustor 11, an upflow chamber 13 and a carbon black separator 15. Coal is introduced to a hopper 17 at the top of the combustor 11 by coal stream 19. The coal stream can contain coal of varying sizes and types depending upon the comditions in the down draft slagging combustor, but washed lignite is preferred and 100 or 200 mesh size is preferred. Oil can be mixed with the lignite to form an oil-lignite slurry, if desired.

Fuel and air are introduced to the hopper 17 through a fuel and air stream 21. The fuel used is preferably methane or natural gas. Importantly, the amount of air introduced produces only a partial combustion so that more carbon black will be formed in the process as opposed to carbon dioxide. The present process is, therefore, a partial combustion process of forming carbon black.

In a conventional process of forming carbon black by partial combustion, the temperature in the combustor is in the range of 800°–1200° C. This temperature range is optimum for the formation of carbon black and higher temperatures would produce no more carbon black while using more heat energy. In this temperature range, the partial combustion of the coal and fuel results in carbon black, fine, dry particles of ash, fine, dry particles of char, and flue gas.

Down draft combustors are well known to the art and the operation of such combustors is described in Kirk-Othmer, Encyclopedia of Chemical Technology, Second Edition, Volume 10, and in the references cited therein. A combustor 11 suitable for the process of the present invention would have a diameter of approximately 30 to 60 centimeters (12 to 24 inches) and a height of approximately 5 to 10 meters (18 to 36 feet).

The present invention greatly improves upon the conventional partial combustion process of forming carbon black by adding oxygen to the down draft slagging combustor in stream 23. Adding oxygen to the fuel rich mixture increases and/or maintains the temperature in the combustor 11 to the range of from 1425° C. to about 1650° C. Most preferably, the temperature in the combustor is maintained at approximately 1500° C. The oxygen can be added to the combuster 11 at a point so that the temperature in the combustor does not fall below the melting point of ash as the stream moves down the combustor. For example, the oxygen could be added approximately 30 centimeters belot the top of the combustor if at this point the combustion temperature would otherwise fall below the melting point of ash.

In the temperature range of from about 1425° C. to about 1650° C. the ash formed from the partial combustion of the coal melts to form a molten ash product which aggregates and falls to the bottom of the combustor 11. This molten ash must be maintained in a molten state for a sufficient time in the combustor 11 for the ash to aggregate and separate from the char, carbon black and flue gas. The char, carbon black and flue gas, however, are carried over to the upflow chamber 13 through a horizontal conduit 25 which connects the lower portion of combustor 11 to the lower portion of upflow chamber 13.

The aggregated molten ash which falls out of the down-flowing stream in combustor 11 accumulates at the bottom of the combustor 11 and is guided by its funnel shape 27 to a removal point. The molten ash product is removed from the combustor in a stream of molten ash 29. If necessary, heater can be added at the bottom of the combustor to prevent solidification of the molten ash.

The upflow chamber 13 has a larger cross-sectional area than the combustor 11 and, therefore, the flow of flue gas, carbon black and char, vertically therethrough, is reduced. A suitable diameter of the upflow chamber would be from about 60 to about 120 centimeters or approximately twice the diameter of the combustor 11. A suitable height of the upflow chamber would be from about 5 to 10 meters or about the same height as the combustor 11.

The cross-sectional area of the chamber 13 is designed so that the flow rate is sufficiently slow so that char will be separated from the flue gas and carbon black and will fall to the bottom of the upflow chamber 13. The char is guided by the funnel-shaped bottom 31 of the upflow chamber 13 to a removal point. It is then removed from the upflow chamber 31 by means of a char stream 33. The temperature in the upflow chamber 13 is not critical since the carbon black and char are dry.

The overhead of the upflow chamber 13 is a stream of flue gas and carbon black and this stream 35 enters the carbon black separator 15. Separation of the carbon black from the flue gas is conventional utilizing either cyclones, bag filters, water separator or other conventional separation devices. The clean flue gas exits the separator 15 in a stream 37 utilized for recycle or heat exchange.

As can be seen, the present invention greatly improves upon the partial combustion process of forming carbon black by increasing and maintaining the combustion temperature above the melting point of ash until the molten ash aggregates and falls out of the stream. This separation and the precipitation of the char in chamber 13 produces an immediate separation of the ash stream 29 and char stream 33 in the process of conveying and separating the carbon black formed in the partial combustion. All prior processes result in a combined ash and char stream which is undesirable. The char from the char stream 33 can be used as a fuel product since the ash which undesirably would have contaminated the char has been removed. This separation of the ash and char has been achieved in the partial combustion process of carbon black formation simply by maintaining the temperature of the combustor in a molten ash range until the ash aggregates and separates. Thus, the separation of ash and char is achieved much more economically than could have been achieved utilizing conventional separation devices for mixed, dry materials.

In addition to or instead of adding oxygen in an oxygen stream 23, the present invention can produce a molten ash product by the addition of a flux stream 39. The flux is used to lower the melting point of the ash. For example, calcium compounds such as calcium carbonate can be added in a stream 39 which enters the hopper 17 to reduce the melting point of the ash to approximately 1200° C. A flux such as calcium carbonate can be added in the range of from about 5 percent by weight to about 50 percent by weight of the ash in the coal. Most preferably the quantity of flux is in the range of from about 10 percent to about 20 percent by weight of the ash in the coal.

Referring now to FIG. 2, an alternate embodiment of the present invention is shown schematically. This embodiment is essentially the same as the embodiment shown in FIG. 1 except that the hopper 17 is mounted tangentially to the top of the combuster 11. The process streams and the equipment downsteam of the combustor are not altered. Tangential mounting of the hopper 17 on the cylindrical combustor 11 causes the flow inside the combustor to be helical. The helically falling stream in the combustor causes the molten ash particles to aggregate and causes the molten ash to be thrown against the walls of the combustor 11 before falling to the bottom 27 of the combustor 11. This promotes the aggregation and separation of the molten ash from the char, carbon black and flue gas.

EXAMPLES

In a first example, a 15% by weight lignite in oil slurry is fed at a rate of 240.5 lb/hr into a four inch tangential reactor with a tangential air flow rate of 16,000 scfh and an axial air flow rate of 450 scfh. The reactor tube is 72 inches long and disposed horizontally. Natural gas fuel is fed with the air at a rate of 1333 scfh. The initial pressure at the inlet of the reactor is 2.5 psig. and 2.0 psig. at the outlet. The lignite is washed, containing 13% ash. Oxygen is introduced at 480 scfh so that the reactor operates at a temperature of approximately 1427° C. or 2600° F. for the first 18 to 20 inches of the reactor. The reactor is operated for 50 minutes.

After the reactor run the reactor is examined and shows an ash slag deposit in the first 20 inches of the tube. At approximately 40 inches, the tube shows a six inch deposit of char. Finally, the carbon black separated at the outlet of the reactor is high quality with only 1% of ash entering with lignite being retained in the carbon black. The char and ash were examined both indicating a good separation.

In a second example, dry pulverized lignite is fed into a four inch tangential reactor at a rate of 94.6 lb/hr. Air is fed tangentially at a rate of 12,000 scfh and axially at 2143 scfh. Natural gas fuel is fed to the reactor at 1000 scfh with an inlet pressure of 2.1 psig. and an outlet pressure of 1.6 psig. The reactor tube length is 100 inches. Oxygen is added at 360 scfh so that the reactor operates at approximately 1427° C. or 2600° F. for the first 18 to 20 inches of the reactor.

As with the first example, the reactor is examined after the run and shows a first zone of molten ash, a second zone of char and the carbon black formed is of high quality.

As can be seen by the above description and examples, the methods and apparatus of the present invention are well adapted to achieve the objects and advantages mentioned as well as those inherent therein. While presently preferred embodiments of the present invention have been described for the purpose of this disclosure, numerous changes in the construction and arrangement of parts and the method can be made by those skilled in the art, which changes are encompassed in the spirit of this invention as defined by the appended claims.

The foregoing disclosure and the showings made in the drawings are merely illustrative of the principles of this invention and are not to be interpreted in a limiting sense.

What is claimed is:

1. A partial combustion process for forming carbon black from coal in which the ash and char formed in the process are separated from the carbon black, said process comprising the steps of:
   introducing coal, fuel and air into the top of a vertically oriented down-draft slagging combustor having a slag receiving chamber at the bottom thereof and operating above the melting point of ash to form a rapidly flowing partially combusted stream of molten ash, char, carbon black and flue gas;
   aggregating the molten ash in the combustor so that aggregated molten ash separates from the partially combusted stream and is deposited in the slag receiving chamber at the bottom of the slagging combustor;
   removing the separated molten ash from the combustor;
   introducing the partially combusted stream of char, carbon black and flue gas from the slagging combustor into a char removal chamber and flowing the stream therein at a rate such that the char is deposited at the bottom of the char removal chamber;
   removing the deposited char from the char removal chamber; and
   introducing carbon black and flue gas from the char removal chamber to a separator and separating the carbon black from the flue gas.

2. The process of claim 1 wherein the partially combusted stream in the combustor is maintained at a temperature in the range of from about 1425° C. to about 1650° C. until the molten ash aggregates and separates.

3. The process of claim 2 which further comprises adding oxygen to said combustor to raise the temperature of the partially combusted stream in the combustor so as to be maintained in the range of from about 1425° C. to about 1650° C. until molten ash aggregates and separates from the partially combusted stream.

4. The process of claim 1 which further comprises introducing a flux so as to reduce the melting point of ash in the partially combusted stream in the combustor.

5. The process of claim 4 wherein said flux comprises a calcium compound.

6. The process of claim 5 wherein said flux comprises calcium carbonate.

7. The process of claim 6 wherein said step of introducing calcium comprises introducing calcium carbonate in the range of from about 5 percent by weight of said ash to about 50 percent by weight of said ash.

8. The process of claim 7 wherein said step of introducing calcium comprises introducing calcium carbonate in the range of from about 10 percent by weight of said ash to about 20 percent by weight of said ash.

9. The process of claim 1 wherein said introducing coal, fuel and air into the top of said combustor comprises tangentially introducing coal, fuel and air into said combustor so as to create a helically falling stream for promoting aggregation of molten ash.

10. A partial combustion process for forming carbon black from coal in which the ash and char formed in the process are separated from the carbon black, said process comprising the steps of:
   introducing coal, fuel and air into the top of a down-draft slagging combustor having a slag receiving chamber at the bottom thereof and maintaining the temperature therein above the melting point of ash to form a rapidly flowing partially combusted stream of molten ash, char, carbon black and flue gas and allowing the molten ash to aggregate sufficiently in the combustor so that it precipitates to the slag receiving chamber at the bottom thereof;
   removing the precipitated ash from the combustor;
   introducing the partially combusted stream of char, carbon black and flue gas from the slagging combustor into a char removal chamber and separating therein the char from the carbon black and flue gas;
   removing the separated char from the char removal chamber; and
   separating carbon black from the carbon black and flue gas remaining after the step of separating the char.

11. The process of claim 10 wherein the molten ash is maintained in the combustor at a temperature in the range of from about 1425° C. to about 1650° C. until the molten ash precipitates to the slag receiving chamber.

12. The process of claim 11 which further comprises adding oxygen to said combustor to maintain the temperature of the molten ash in the range of from about 1425° C. to about 1650° C.

13. The process of claim 10 which further comprises introducing a flux to reduce the melting point of ash in the partially combusted stream in the combustor.

14. The process of claim 13 wherein said flux comprises a calcium compound.

15. The process of claim 14 wherein said flux comprises calcium carbonate in the range of from about 5 percent by weight of said ash to about 50 percent by weight of said ash.

16. The process of claim 10 wherein said step of introducing coal, fuel and air into the top of said combustor comprises tangentially introducing coal, fuel and air into said combustor so as to create a helically falling stream for promoting aggregation of molten ash.

* * * * *

UNITED STATES PATENT AND TRADEMARK OFFICE
CERTIFICATE OF CORRECTION

PATENT NO. : 4,689,210

DATED : August 25, 1987

INVENTOR(S) : E. Webb Henderson

It is certified that error appears in the above-identified patent and that said Letters Patent are hereby corrected as shown below: Title page:

In the second line of the Abstract of the Disclosure, delete the word "fo" and substitute the word --of-- therefor;

Column 1, line 10, delete the word "ask" and substitute the word --ash-- therefor;

Column 1, lines 33 and 34, delete the word "significatn" and substitute the word --significant-- therefor;

Column 2, line 16, delete the word "form" and substitute the word --from-- therefor;

Column 2, line 50, delete the word "camditions" and substitute the word --conditions-- therefor;

Column 3, line 24, delete the word "belot" and substitute the word --below-- therefor;

Column 3, line 44, delete the word "heater" and substitute the word --heaters-- therefor;

Signed and Sealed this

Twenty-third Day of February, 1988

*Attest:*

DONALD J. QUIGG

*Attesting Officer*     *Commissioner of Patents and Trademarks*